(12) United States Patent
Peter et al.

(10) Patent No.: US 11,501,183 B2
(45) Date of Patent: Nov. 15, 2022

(54) GENERATING A RECOMMENDATION ASSOCIATED WITH AN EXTRACTION RULE FOR BIG-DATA ANALYSIS

(71) Applicant: HCL Australia Services Pty. Ltd, North Sydney (AU)

(72) Inventors: Jose Peter, North Sydney (AU); Dong Hun Lee, North Sydney (AU)

(73) Assignee: HCL Australia Services Pty. Ltd, North Sydney (AU)

( * ) Notice: Subject to any disclaimer, the term of this patent is extended or adjusted under 35 U.S.C. 154(b) by 689 days.

(21) Appl. No.: 16/511,657

(22) Filed: Jul. 15, 2019

(65) Prior Publication Data

US 2021/0019637 A1 Jan. 21, 2021

(51) Int. Cl.
*G06F 40/284* (2020.01)
*G06N 5/02* (2006.01)
*G06N 5/04* (2006.01)

(52) U.S. Cl.
CPC .......... *G06N 5/025* (2013.01); *G06F 40/284* (2020.01); *G06N 5/04* (2013.01)

(58) Field of Classification Search
CPC ...... G06F 40/117; G06F 40/20; G06F 40/237; G06F 40/242; G06F 40/279; G06F 40/284; G06N 5/025
USPC ........ 704/1, 9, 10; 706/47, 48; 707/724, 729
See application file for complete search history.

(56) References Cited

U.S. PATENT DOCUMENTS

| | | | |
|---|---|---|---|
| 8,370,329 B2 | 2/2013 | Gutt et al. | |
| 9,934,331 B2 | 4/2018 | Rampson et al. | |
| 10,810,357 B1* | 10/2020 | Tsypliaev | G06F 40/289 |
| 11,100,150 B2* | 8/2021 | Carasso | G06F 40/40 |
| 11,132,421 B1* | 9/2021 | Wang | G06N 5/025 |
| 2006/0179405 A1* | 8/2006 | Chao | G06F 40/186 715/209 |
| 2006/0294460 A1* | 12/2006 | Chao | G06F 40/103 715/209 |
| 2008/0256040 A1* | 10/2008 | Sundaresan | G06F 40/30 |
| 2009/0172517 A1* | 7/2009 | Kalicharan | G06F 40/205 715/234 |
| 2010/0005049 A1* | 1/2010 | Kawai | G06F 40/295 706/47 |

(Continued)

FOREIGN PATENT DOCUMENTS

| | | |
|---|---|---|
| CN | 107169821 A | 9/2017 |
| WO | 2015143239 A1 | 9/2015 |

*Primary Examiner* — Martin Lerner

(74) *Attorney, Agent, or Firm* — Kendal Sheets

(57) ABSTRACT

Disclosed is a system for generating a recommendation associated with an extraction rule for big-data analysis. The system may receive a set of data blocks and an extraction rule. The extraction rule comprises an identifier and a first range associated with the identifier in the set of data blocks. The system identifies a set of words associated with the identifier in one or more data blocks from the set of data blocks based on a provenance knowledge. The provenance knowledge is indicative of a relationship between the word and the identifier. The system identifies a set of locations associated with the set of words in the one or more data blocks. The system generates a second range associated with the identifier based on the set of locations. The system recommends the second range for modifying the extraction rule for big-data analysis based on an accuracy change.

11 Claims, 3 Drawing Sheets

(56) References Cited

U.S. PATENT DOCUMENTS

| | | | |
|---|---|---|---|
| 2011/0246464 A1* | 10/2011 | Okamoto | G06F 40/237 |
| | | | 707/737 |
| 2013/0275453 A1 | 10/2013 | Vyas et al. | |
| 2014/0082003 A1* | 3/2014 | Feldman | G06F 40/205 |
| | | | 707/755 |
| 2014/0207792 A1* | 7/2014 | Carasso | G06F 40/211 |
| | | | 707/748 |
| 2015/0074507 A1* | 3/2015 | Riediger | G06F 40/169 |
| | | | 715/230 |
| 2016/0103823 A1* | 4/2016 | Jackson, Jr. | G06N 5/025 |
| | | | 704/9 |
| 2017/0270088 A1* | 9/2017 | Carasso | G06F 40/40 |
| 2018/0246883 A1 | 8/2018 | Wang | |
| 2019/0179893 A1* | 6/2019 | Mulwad | G06F 40/30 |
| 2019/0243841 A1* | 8/2019 | Hoffmann | G06F 40/174 |
| 2019/0286667 A1* | 9/2019 | Puzicha | G06F 16/93 |
| 2020/0293617 A1* | 9/2020 | Luo | G06F 40/30 |
| 2020/0301920 A1* | 9/2020 | Bleigh | G06F 16/2465 |
| 2022/0207384 A1* | 6/2022 | Florian | G06N 5/025 |

* cited by examiner

GENERATING A RECOMMENDATION ASSOCIATED WITH AN EXTRACTION RULE FOR BIG-DATA ANALYSIS

PRIORITY INFORMATION

This patent application does not claim priority from any application.

TECHNICAL FIELD

The present subject matter described herein, in general, relates to generating a recommendation for big-data analysis and more particularly to generating the recommendation associated with an extraction rule for big-data analysis.

BACKGROUND

Generally, several quintillion bytes of data may be generated on a daily basis. The generation of the data may be accelerated using an artificial intelligence, mobile communications and Internet of Things. Major part of the data generated may be unstructured data. Further, in order to understand the unstructured data, an analytics may be performed on the unstructured data to extract meaningful data from the unstructured data. The meaningful data may be in a structured form, and relevant for further use. It is to be noted that multiple analytics need to be performed on the unstructured data to generate the meaningful data. Thus, a quality of the analytics may determine a quality of the meaningful data.

SUMMARY

Before the present systems and methods for generating a recommendation associated with an extraction rule for big-data analysis, are described, it is to be understood that this application is not limited to the particular systems, and methodologies described, as there can be multiple possible embodiments to generate a recommendation associated with an extraction rule for big-data analysis which are not expressly illustrated in the present disclosure. It is also to be understood that the terminology used in the description is for the purpose of describing the particular versions or embodiments of the present application only and is not intended to limit the scope of the present application. This summary is provided to introduce concepts related to systems and methods for generating a recommendation associated with an extraction rule for big-data analysis and the concepts are further described below in the detailed description. This summary is not intended to identify essential features of the claimed subject matter nor is it intended for use in determining or limiting the scope of the claimed subject matter.

In one implementation, a method for generating a recommendation associated with an extraction rule for big-data analysis is disclosed. Initially, in the method, a set of data blocks and an extraction rule may be received. The extraction rule may comprise an identifier and a first range associated with the identifier in the set of data blocks. Each data block from the set of data blocks comprises one or more words. The method further comprises identifying a set of words associated with the identifier in one or more data blocks from the set of data blocks. The set of words may be associated with the identifier. The set of words may be identified based on a provenance knowledge. The provenance knowledge may be indicative of a relationship between the word and the identifier. Further the method may comprise identifying a set of locations associated with the set of words in one or more data blocks. A second range may be generated based on the set of locations. Furthermore, the method may comprise recommending the second range for modifying the extraction rule for big-data analysis based on an accuracy change.

In another implementation, a system for generating a recommendation associated with an extraction rule for big-data analysis is disclosed. Initially, the system may receive, a set of data blocks and an extraction rule. The extraction rule may comprise an identifier and a first range associated with the identifier in the set of data blocks. Each data block from the set of data blocks comprises one or more words. Further, the system may identify a set of words in one or more data blocks from the set of data blocks. The set of words may be associated with the identifier. The set of words may be identified based on a provenance knowledge. The provenance knowledge may be indicative of a relationship between the word and the identifier. Further, the system may identify a set of locations associated with the set of words in one or more data blocks. The system may generate a second range based on the set of locations. Furthermore, the system may recommend the second range for modifying the extraction rule for big-data analysis based on an accuracy change.

In yet another implementation, non-transitory computer readable medium embodying a program executable in a computing device for generating a recommendation associated with an extraction rule for big-data analysis is disclosed. Initially, the program code may receive, a set of data blocks and an extraction rule. The extraction rule may comprise an identifier and a first range associated with the identifier in the set of data blocks. Each data block from the set of data blocks comprises one or more words. Further, the program code may identify a set of words in one or more data blocks from the set of data blocks. The set of words may be associated with the identifier. The set of words may be identified based on a provenance knowledge. The provenance knowledge may be indicative of a relationship between the word and the identifier. Further, the program code may identify a set of locations associated with the set of words in one or more data blocks. The program code may generate a second range based on the set of locations. Furthermore, the program code may recommend the second range for modifying the extraction rule for big-data analysis based on an accuracy change.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus for generating a recommendation associated with an extraction rule for big-data analysis disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
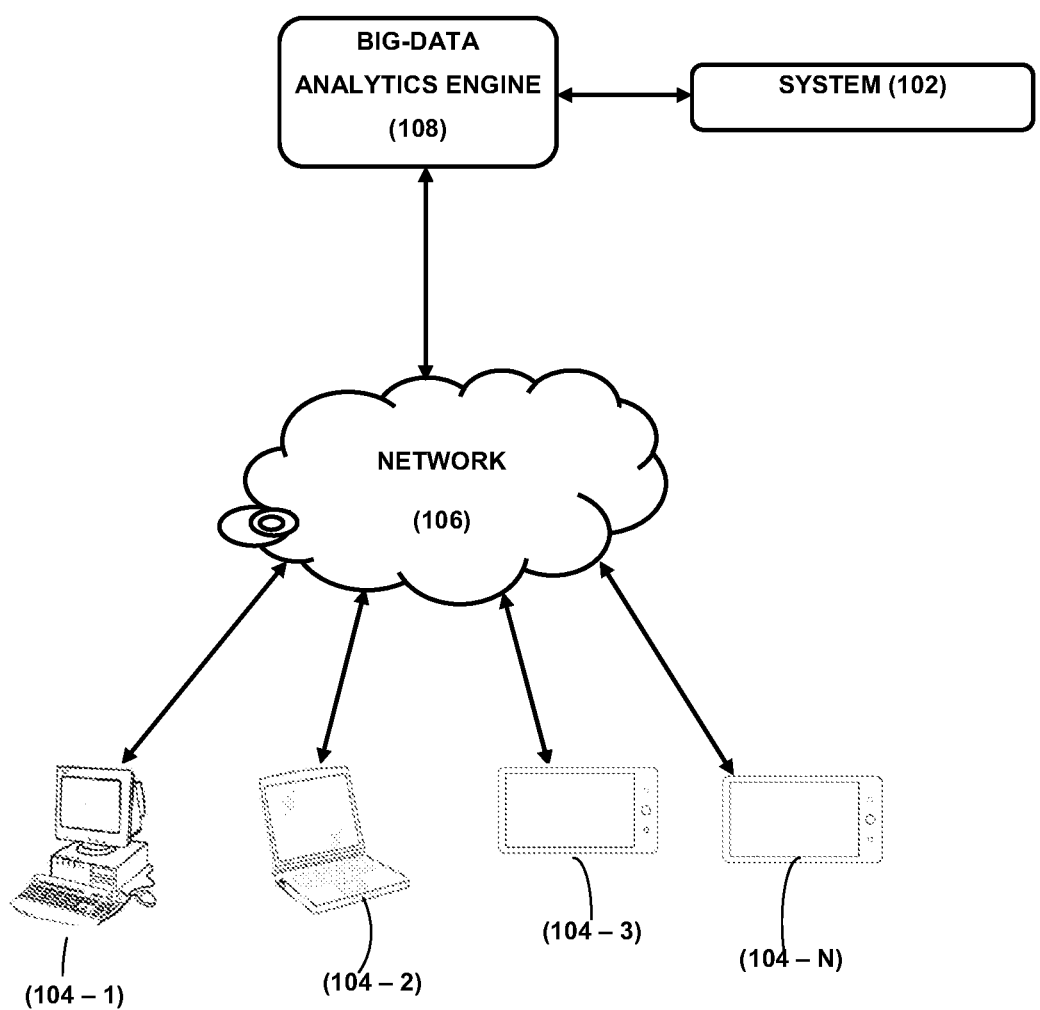
FIG. 1 illustrates a network implementation of a system for generating a recommendation associated with an extraction rule for big-data analysis, in accordance with an embodiment of the present subject matter.

Some embodiments of this disclosure, illustrating all its features, will now be discussed in detail. The words "receiving", "identifying", "recommending", "generating" and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any systems and methods similar or equivalent to those generating a recommendation associated with an extraction rule for big-data analysis described herein can be used in the practice or testing of embodiments of the present disclosure, the exemplary, systems and methods for generating the recommendation associated with the extraction rule for the big-data analysis are now described. The disclosed embodiments are merely exemplary of the disclosure, which may be embodied in various forms.

Various modifications to the embodiment of generating a recommendation associated with an extraction rule for big-data analysis will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

While aspects of described system and method for generating a recommendation associated with an extraction rule for big-data analysis may be implemented in any number of different computing systems, environments, and/or configurations, the embodiments are described in the context of the following exemplary system for generating a recommendation associated with an extraction rule for big-data analysis.

The present subject matter may describe a system to remove a necessity of manual analysis of big-data to predict a modification for an extraction rule. In the present subject matter, the big-data may indicate an unstructured form of the big-data, and the extraction rule may indicate a rule for extracting meaningful data from the big-data. The system may further provide real-time adjustment to the extraction rule. The real-time adjustment to the extraction rule may overcome any manual oversights and assumptions. Further, the system may provide a certainty over predictability of data extracted based on suggestion comprising modification of the extraction rule. Furthermore, the system may be scalable to accommodate at least an update in the big-data.

The present disclosure describes a system and method for generating a recommendation associated with an extraction rule for big-data analysis. In one embodiment, a set of data blocks and an extraction rule may be received. The extraction rule may comprise an identifier and a first range associated with the identifier. Further, the set of data blocks may comprise one or more words. The one or more data blocks from the set of data blocks may be analyzed to generate a new extraction rule. Further, the new extraction rule may be recommended during the big-data analysis. In one embodiment, the extraction rule may be replaced by the new extraction rule.

FIG. 1 Description

Referring now to FIG. 1, a network implementation 100 of a system 102 for generating a recommendation associated with an extraction rule for big-data analysis is disclosed. Although the present subject matter is explained considering that the system 102 to generate the recommendation associated with the extraction rule for the big-data analysis is implemented on a server, it may be understood that the system 102 may also be implemented in a variety of computing systems, such as a laptop computer, a desktop computer, a notebook, a workstation, a mainframe computer, a server, a network server, embedded hardware platform board, reprogrammable device platform and the like. Further, the system 102 may be implemented over a big-data analytics engine 108.

In one implementation, the big-data analytics engine 108 may be implemented over a cloud network. Further, it will be understood that the big-data analytics engine 108 may be accessed by multiple client devices of one or more 104.1, 104.2 104.N, collectively referred to as a client device 104. The big-data analytics 108 engine may receive a big-data file in an unstructured form from the client device 104. Further, the big-data analytics engine 108 may receive a set of analytics to be performed on the big-data file. The big-data analytics engine 108 may execute the set of analytics to extract a meaningful data from the big-data file. Further, the system 102 may assist the big-data analytics engine 108 to extract the meaningful data.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may receive a set of data blocks and an extraction rule from the big-data analytics engine 108. The extraction rule may comprise an identifier and a first range associated with the identifier in the set of data blocks. The set of data blocks may be the big-data file received by the big-data analytics engine 108 from the client device 104. Each of a data block from the set of data blocks may comprise one or more words. Further, the system 102 may identify a set of words associated with the identifier in one or more data blocks from the set of data blocks. The set of words may be identified based on a provenance knowledge. The provenance knowledge may be indicative of a relationship between the word and the identifier.

The system 102 may further identify a set of locations associated with the set of words in the one or more data blocks. Further, the system 102 may generate a second range associated with the identifier based on the set of locations.

The system 102 may recommend the second range to the big-data analytics engine 108 based on an accuracy change.

FIG. 2 Description

Figure 2:
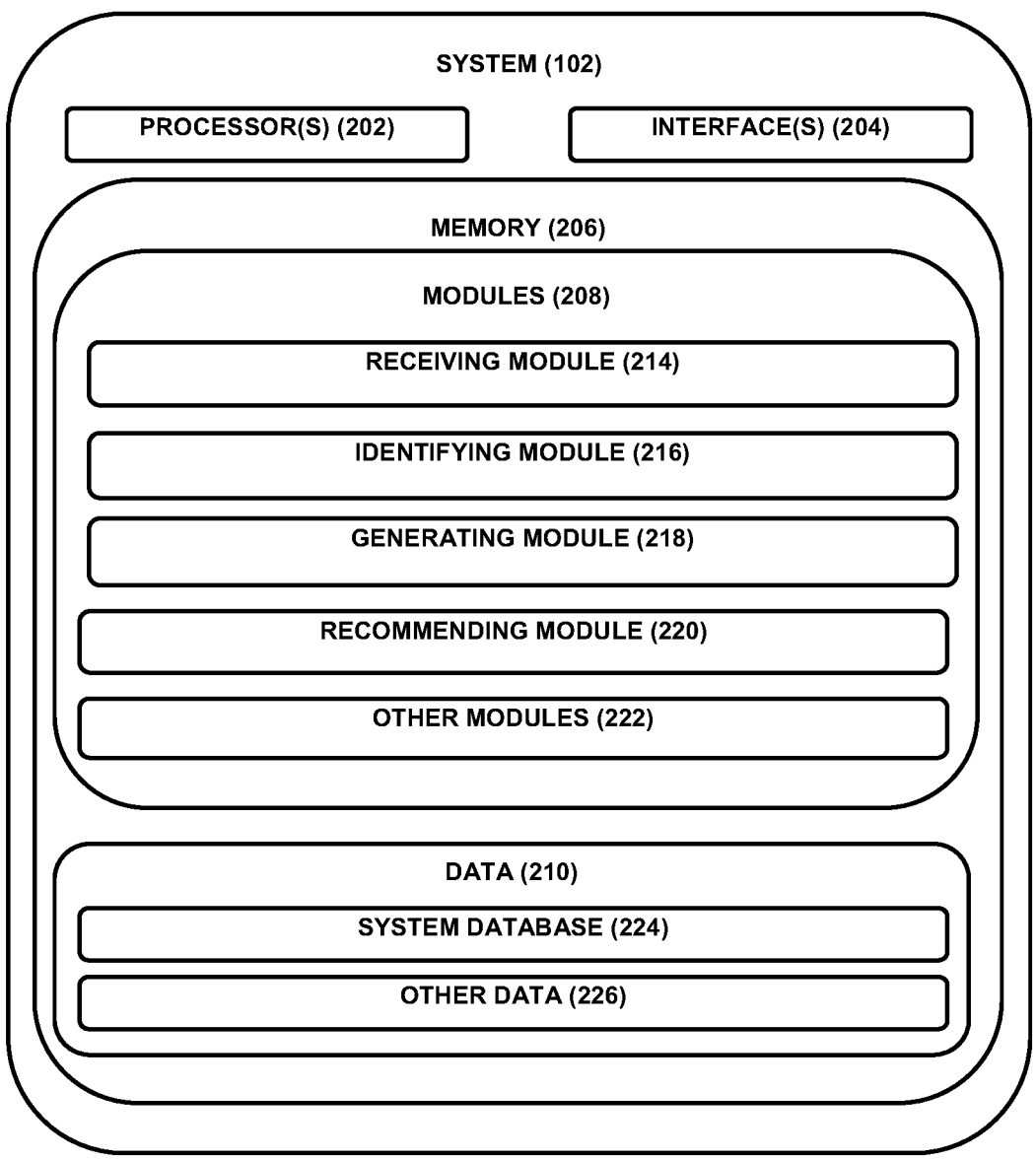
FIG. 2 illustrates a hardware implementation of a system for generating a recommendation associated with an extraction rule for big-data analysis, in accordance with an embodiment of the present subject matter.

Referring now to FIG. 2, a hardware implementation of a system 102 for generating a recommendation associated with an extraction rule for big-data analysis, is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Amongst other capabilities, the at least one processor 202 is configured to fetch and execute computer-readable instructions stored in the memory 206.

The I/O interface 204 may include a variety of software and hardware interfaces, for example, a web interface, a graphical user interface, an Application Programming Interface (API) and the like. The I/O interface 204 may allow the system 102 to interact with the big-data analytics engine 108. Further, the big-data analytics engine 108 may interact with the client directly or through the client device 104. The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of big-data analytics engines or to another server that accesses big-data analytics engine 108.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 214, an identifying module 216, a generating module 218, a recommending module 220 and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

Receiving Module 214

In one embodiment, the receiving module 214 may receive a set of data blocks and an extraction rule. The set of data blocks may be in a form of unstructured big-data. In one example, the unstructured big-data may be present in at least one of a '*.txt' file format or a '*.json' file format. Further, a data block from the set of data blocks may be at least one of a review, a comment, a feedback, a grievance and the like. In an example, the set of data blocks may comprise reviews of a set of customers. The reviews may be associated to a telecom service provider. Each data block, from the set of data blocks, comprises a review from each customer of the telecom service provider.

Further, each data block may comprise one or more words. Furthermore, a first word of each data block may be considered to be at a location 'one', whereas a last word in each data block may be considered at a location equal to a total number of words in each data block. In one example, the total number of words in the data block may be a hundred words. Therefore, the first word may be at the location 'one', whereas the last word may be at the location 'hundred'.

Further, the extraction rule may comprise an identifier and a first range associated with the identifier in the set of data blocks. The identifier may be based on a type of the big-data analysis that is performed. In one embodiment, the big-data analysis may be a prescriptive analysis. In an example, construe the set of data blocks indicating feedback received from users. Further, the identifier may be an 'emotion' of the user. In one embodiment, a set of identifiers associated with a set of extraction rules may be received. The set of identifiers may be further used for extracting relevant data from the big-data.

Furthermore, the first range of location associated with the identifier may comprise a first lower location and a first upper location. The first lower location and the first upper location may lie between the location of the first word and the location of the last word in each data block.

In one embodiment, the receiving module 214 may be configured to identify an error in the identifier. To identify the error, the receiving module 214 may receive one or more requirements from a client. Once the one or more requirements are received, a dictionary may be created based on the one or more requirements. The dictionary may comprise a set of keywords identified based on the one or more requirements. The dictionary may further comprise definitions of the set of keywords. The definitions of the set of keywords may be used to analyse the identifier based on a provenance knowledge. The provenance knowledge may be indicative of the relationship between the identifier and the set of keywords. The receiving module 214 may identify the error based on analysing the identifier with respect to the definitions of the set of keywords. In one embodiment, the receiving module 214 may store the definitions of the set of keywords in the system database 224.

Identifying Module 216

Upon receiving the set of data blocks and the extraction rule, the identifying module 216 may be configured to identify a set of words associated with the identifier. The identification of the set of words may be performed in one or more data blocks from the set of data blocks. Further, the identification of the set of words may be performed using the provenance knowledge. The provenance knowledge may be indicative of a relationship between the identifier and the set of words.

Once the set of words are identified, the identifying module 216 may be further configured to identify a set of locations associated with the set of words. The set of words may be identified in one or more data blocks. In one example, the identifier may be a name, and the one or more data blocks may be one or more reviews. In a first review, the number of words may be hundred. Further, the identification module 216 may identify the word associated with the identifier at tenth location of the first review. Further, in a second review, the location of the name may be present in the twelfth location. In a similar manner, the identification module 216 may identify the set of locations associated with the words from one or more reviews.

In one embodiment, the set of words identified by the identifying module 216 may be compared with a Gold standard. In one aspect, the gold standard may be a predefined standard received from the client. In another aspect, the gold standard may be stored in a repository. The Gold standard may define an expected result of the big-data analysis.

Based on the comparison of the set of words and the gold standard, the identifying module 216 may modify the provenance knowledge. Further, after the modification, the identifying module 216 may be configured to identify a new set of words associated with the identifier along with a new set of locations associated with the set of words.

Generating Module 218

Based on the set of locations, the generating module 218 may be configured to generate a second range associated with the identifier. The second range may comprise a second lower location and a second upper location from the set of locations. The set of locations may be present in one or more data blocks. Each data block from the one or more data blocks may comprise one or more words. The first word of each data block may be considered to be at a location 'one', whereas the last word in each of the data blocks may be considered at a location equal to a total number of words in each data block. A location from the set of locations may have a value between one and a number equal to the location of the last word. The second lower location may have a lowest value from the set of locations and the second upper location may have a highest value.

In an example, the set of locations identified may be tenth, fifteenth, twelfth, thirteenth and ninth. Here each location is identified at least from each of the data blocks. In the example, the second lower location is nine and the second upper location is fifteen. Thus, the second range associated with the identifier may be nine to fifteen.

Recommending Module 220

Once the second range may be generated by the generating module, the recommending module 220 may be configured to recommend the second range for modifying the extraction rule for big data analysis. The recommending module 220 may be configured to provide recommendation based an accuracy change. In order to compute the accuracy change, the recommending module 220 may generate a first accuracy of an analysis result of the big-data analysis. The first accuracy may be generated by implementing the first range associated with the identifier.

In the next step, the recommending module 220 may generate a second accuracy of the analysis result. The second accuracy may be generated by implementing the second range identified by the identifying module 216. Further, the recommending module 220 may compute the accuracy change based on comparing the first accuracy and the second accuracy.

In one embodiment, if the first accuracy is higher than the second accuracy, then the recommending module 220 may not suggest the recommendation of the second range. In another embodiment, if the second accuracy is higher than the first accuracy, then recommending module 220 may suggest the second range for the identifier.

In one implementation, the recommending module 220 may modify the extraction rule with the second range, when the second accuracy is higher than the first accuracy. In other words, the extraction rule may be modified by replacing the first range with the second range.

Example

In one exemplary embodiment, consider a telecom provider that needs to perform the big-data analysis on a set of reviews. The set of reviews may be provided by subscribers of the telecom provider. The set of review may comprise comments from users regarding services provided by the telecom provider. The comments may comprise sentiments, grievances, escalations of the users regarding the services. The dictionary may be generated comprising the set of identifiers. In one embodiment, the system may generate the dictionary based on the requirement of the telecom provider. In the present case, the dictionary may include the set identifiers comprising a name, a location, a plan, a sentiment and an escalation.

The system 102 may further receive the set of extraction rules. The extraction rule from the set of extraction rules may comprise the identifier and the first range associated with the identifier. In the example, the extraction rule may comprise "Name {1-8}". Here the identifier may be the Name and the first range of 1-8. Similarly, the system may receive the set of extraction rules comprising "Location {15-20}", "Plan {19-35}", "Sentiment {30-50}" and "Escalation {45-60}".

The system 102 may identify a set of names associated with the identifier Name. The set of names in the set of reviews may be John, Tom, Harry etc. The set of names may be identified at locations of ten, twelve, fifteen, eighteen and thirteen. The second lower location may be ten. The second upper location may be eighteen. Therefore, the second range may be 10-18. In a similar manner, the second range may be calculated for a set of identifiers associated with the set of extraction rules.

Further based on calculating the second range for the identifier, the system 102 may compare the accuracy of the first range with respect to the second range during the big-data analysis. Further based on the accuracy, the system 102 may determine whether to provide the suggestion for the extraction rule. In the example, if the accuracy of the first range is 20% while the accuracy of the second range is 30%, then the system 102 may suggest the second range. In one embodiment, the system 102 may replace the first range with the second range based on the accuracy.

FIG. 3 Description

Figure 3:
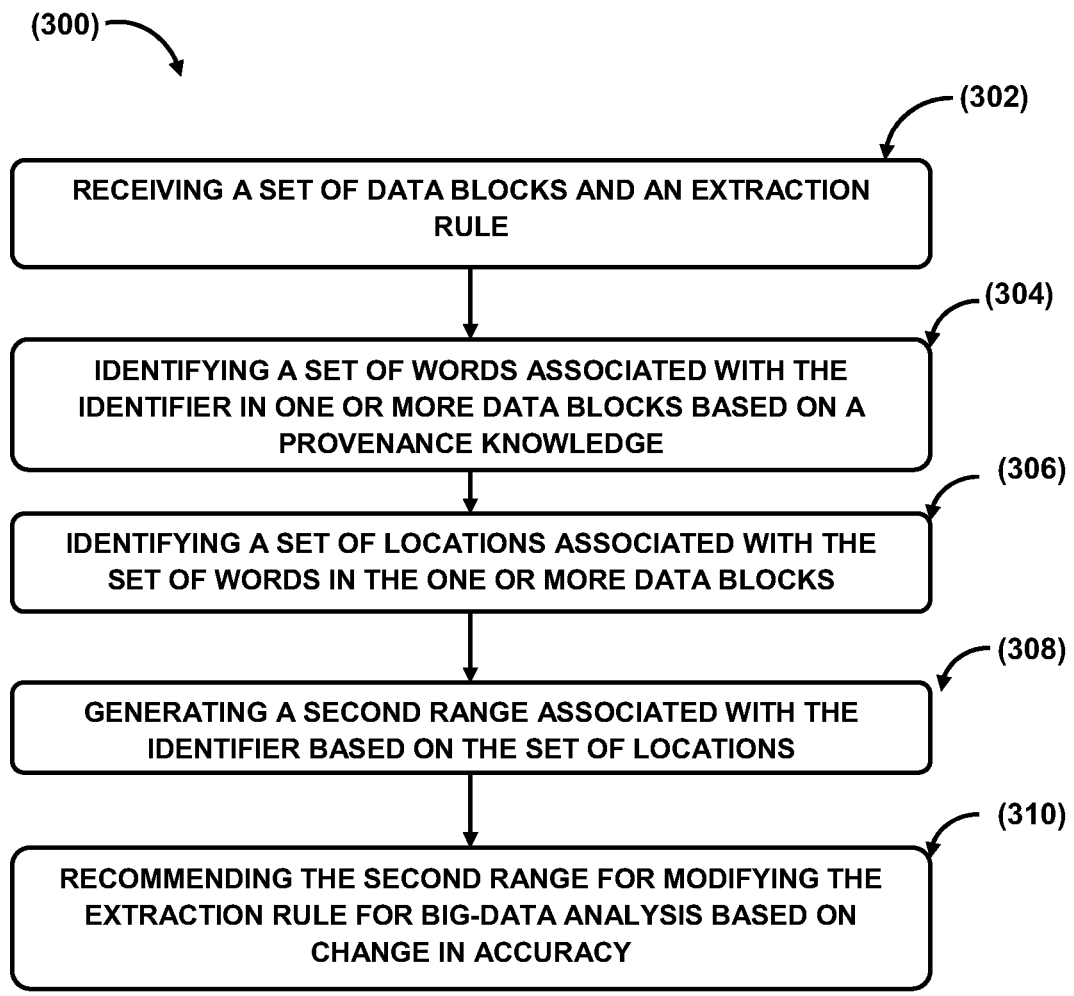
FIG. 3 illustrates a method for generating a recommendation associated with an extraction rule for big-data analysis using a system, in accordance with an embodiment of the present subject matter.

Referring now to FIG. 3, a method 300 for generating a recommendation associated with an extraction rule for big-data analysis is shown, in accordance with an embodiment of the present subject matter. The method 300 may be described in the general context of computer executable instructions. Generally, computer executable instructions can include routines, programs, objects, components, data structures, procedures, modules, functions, etc., that perform functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be implemented as described in the system 102.

At block 302, a set of data blocks and an extraction rule may be received. In one implementation, the set of data blocks and the extraction rule may be received by a receiving module 214 and linked to system database 224.

At block 304, a set of words associated with the identifier may be identified in one or more data blocks based on a provenance knowledge. In one implementation, the set of words may be identified by an identifying module 216 and tied to system database 224.

At block 306, a set of locations may be identified, wherein the set of locations are associated with the set of words in or more data blocks. In one implementation, the set of locations may be identified by the identifying module 216 and tied to system database 224.

At block 308, a second range associated with the identifier may be generated based on the set of locations. In one implementation, the second range associated with the identifier may be generated by the generating module 218 and tied to system database 224.

At block 310, a second range may be recommended for modifying the extraction rule for big-data analysis based on change in accuracy. In one implementation, the second range may be recommended by a recommending module 220 and tied to system database 224.

Exemplary embodiments discussed above may provide certain advantages. Though not required to practice aspects of the disclosure, these advantages may include those provided by the following features.

Some embodiments enable a system and a method to eliminate manual analysis of the big-data for predicting a modification in the extraction rule.

Some embodiments enable a system and a method to enable a real-time recommendation for the extraction rule associated with the identifier. The real-time recommendation may overcome any manual oversights and assumptions.

Some embodiments enable a system and a method to enable scalability to accommodate at least an update in the big-data.

Although implementations for methods and systems to generate the recommendation associated with an extraction rule for big-data analysis of a user have been described in language specific to structural features and/or methods, it is to be understood that the appended claims are not necessarily limited to the specific features or methods described. Rather, the specific features and methods are disclosed as examples of implementations of the present subject matter using the system.

The invention claimed is:

1. A method for generating a recommendation associated with an extraction rule for big-data analysis, the method comprising the steps of:

receiving, by a processor, a set of data blocks, and an extraction rule, wherein the extraction rule comprises an identifier and a first range associated with the identifier in the set of data blocks, and wherein each of a data block from the set of data blocks comprises one or more words, and wherein the first range is indicative of a first lower location and a first upper location associated to the one or more words in the data block, and wherein the data block comprises a first word and a last word, and wherein a location of the first word is one and a location of the last word is equal to a total number of one or more words in the data block, and wherein the lower location and the upper location lie within the location of the first word and the location of the last word;

identifying, by the processor, a set of words associated with the identifier in one or more data blocks from the set of data blocks based on a provenance knowledge, wherein the provenance knowledge indicative of a relationship between the word and the identifier;

identifying, by the processor, a set of locations associated with the set of words in the one or more data blocks;

generating, by the processor, a second range associated with the identifier based on the set of locations, wherein the set of locations includes a second lower location and a second upper location associated to the second range with respect to the data block, and wherein the second range is indicative of the second lower location and the second upper location associated to one or more words in the data block; and recommending, by the processor, the second range for modifying the extraction rule for big-data analysis based on an accuracy change.

2. The method as claimed in claim 1, further comprises computing the accuracy change, wherein computing the accuracy change comprises the steps of:

generating, by the processor a first accuracy of an analysis result by implementing the first range associated with the identifier in the big-data analysis;

generating, by the processor a second accuracy of the analysis result by implementing the second range associated with the identifier in the big-data analysis; and computing, by the processor the accuracy change based on comparing the first accuracy and the second accuracy.

3. The method as claimed in claim 1, further comprises identifying an error in the identifier, wherein identifying the error comprises the steps of:

generating, by the processor a dictionary to perform the big-data analysis, wherein the dictionary comprises definitions of a set of keywords;

receiving, by the processor the extraction rule comprising the identifier and the first range associated with the identifier; and identifying, by the processor the error in the identifier based on an analysis of the identifier with respect to the definitions of the set of keywords.

4. The method as claimed in claim 1, wherein the data block is indicative of at least one of a review, a comment, a feedback or a grievance.

5. The method as claimed in claim 1, further comprises modifying the extraction rule by replacing the first range with the second range in the extraction rule based on the accuracy change.

6. A system for generating a recommendation associated with an extraction rule for big-data analysis, wherein the system comprises:

a processor and a memory coupled to the processor wherein the processor executes a set of instructions stored in the memory to:

receive a set of data blocks, an extraction rule, wherein the extraction rule comprises an identifier and a first range associated with the identifier in the set of data blocks, and wherein each of a data block from the set of a data block comprises one or more words, and wherein the first range is indicative of a first lower location and a first upper location associated to the one or more words in the data block, and wherein the data block comprises a first word and a last word, and wherein a location of the first word is one and a location of the last word is equal to a total number of one or more words in the data block, and wherein the lower location and the upper location lie within the location of the first word and the location of the last word;

identify a set of words associated with the identifier in one or more data blocks from the set of data blocks based on a provenance knowledge, wherein the provenance knowledge indicative of a relationship between the word and the identifier;

identify a set of locations associated with the set of words in the one or more data blocks;

generate a second range associated with the identifier based on the set of locations, wherein the set of locations includes a second lower location and a second upper location associated to the second range with respect to the data block, and wherein the second range is indicative of the second lower location and the second upper location associated to one or more words in the data block; and recommend the second range for modifying the extraction rule for big-data analysis based on an accuracy change.

7. The system as claimed in claim 6, further comprises computing the accuracy change, wherein computing the accuracy change comprises the steps of:

generating, by the processor a first accuracy of an analysis result by implementing the first range associated with the identifier in the big-data analysis;

generating, by the processor a second accuracy of the analysis result by implementing the second range associated with the identifier in the big-data analysis; and computing, by the processor the accuracy change based on comparing the first accuracy and the second accuracy.

8. The system as claimed in claim 6, further comprises identifying an error in the identifier, wherein identifying the error comprises the steps of:

generating, by the processor a dictionary to perform the big-data analysis, wherein the dictionary comprises definitions of a set of keywords;

receiving, by the processor the extraction rule comprising the identifier and the first range associated with the identifier; and identifying, by the processor the error in the identifier based on an analysis of the identifier with respect to the definitions of the set of keywords.

9. The system as claimed in claim 6, wherein the data block is indicative of at least one of a review, a comment, a feedback or a grievance.

10. The system as claimed in claim 6, further comprises modifying the extraction rule by replacing the first range with the second range in the extraction rule based on the accuracy change.

11. A non-transitory computer readable medium embodying a program executable in a computing device for generating a recommendation associated with an extraction rule for big-data analysis, the program comprising:

receiving a set of data blocks, an extraction rule, wherein the extraction rule comprises an identifier and a first range associated with the identifier in the set of data blocks, wherein each of a data block from the set of data block comprises one or more words, and wherein the first range is indicative of a first lower location and a first upper location associated to the one or more words in the data block, and wherein the data block comprises a first word and a last word, and wherein a location of the first word is one and a location of the last word is equal to a total number of one or more words in the data block, and wherein the lower location and the upper location lie within the location of the first word and the location of the last word;

identifying a set of words associated with the identifier in one or more data blocks from the set of data blocks based on a provenance knowledge, wherein the provenance knowledge indicative of a relationship between the word and the identifier;

identifying a set of locations associated with the set of words in the one or more data blocks;

generating a second range associated with the identifier based on the set of locations, wherein the set of locations includes a second lower location and a second upper location associated to the second range with respect to the data block, and wherein the second range is indicative of the second lower location and the second upper location associated to one or more words in the data block; and recommending the second range for modifying the extraction rule for big-data analysis based on a change in accuracy.

* * * * *